US010190638B2

United States Patent
Ishii et al.

(10) Patent No.: US 10,190,638 B2
(45) Date of Patent: Jan. 29, 2019

(54) ROLLING BEARING

(71) Applicant: JTEKT CORPORATION, Osaka-shi, Osaka (JP)

(72) Inventors: Yasuhiko Ishii, Kashiwara (JP); Takashi Iwata, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/578,482

(22) PCT Filed: Jun. 1, 2016

(86) PCT No.: PCT/JP2016/066287
§ 371 (c)(1),
(2) Date: Nov. 30, 2017

(87) PCT Pub. No.: WO2016/194980
PCT Pub. Date: Dec. 8, 2016

(65) Prior Publication Data
US 2018/0163786 A1    Jun. 14, 2018

(30) Foreign Application Priority Data
Jun. 3, 2015    (JP) .................. 2015-112812

(51) Int. Cl.
*F16C 33/80*    (2006.01)
*F16C 33/78*    (2006.01)
(Continued)

(52) U.S. Cl.
CPC .............. *F16C 33/80* (2013.01); *F16C 19/06* (2013.01); *F16C 19/163* (2013.01); *F16C 33/58* (2013.01);
(Continued)

(58) Field of Classification Search
CPC ................ F16C 19/163; F16C 33/6607; F16C 33/7823; F16C 33/7826; F16C 33/7846; F16C 33/80
See application file for complete search history.

(56) References Cited

U.S. PATENT DOCUMENTS

| 3,350,148 A | 10/1967 | Sanguinetti et al. |
| 3,414,275 A | 12/1968 | Takahashi |
| (Continued) | | |

FOREIGN PATENT DOCUMENTS

| DE | 102009009633 A1 | 8/2010 | |
| FR | 1351942 A * | 2/1964 | .......... F16C 33/7846 |
| (Continued) | | | |

OTHER PUBLICATIONS

Aug. 30, 2016 International Search Report issued in International Patent Application No. PCT/JP2016/066287.
(Continued)

*Primary Examiner* — Phillip A Johnson
(74) *Attorney, Agent, or Firm* — Oliff PLC

(57) ABSTRACT

A rolling bearing includes an inner ring, an outer ring, a plurality of rolling elements, and a cage. A first seal is provided on one side of the annular space between the inner ring and the outer ring in the axial direction and has a first lip portion that forms a first labyrinth clearance with the inner ring to prevent spill of the grease. A second seal is provided on the other side of the annular space in the axial direction and has a second lip portion that forms a second labyrinth clearance with the inner ring to prevent spill of the grease. The second lip portion is larger than the first lip portion such that the path length of the second labyrinth clearance is longer than the path length of the first labyrinth clearance.

10 Claims, 4 Drawing Sheets

(51) Int. Cl.
*F16C 19/16* (2006.01)
*F16C 33/58* (2006.01)
*F16C 19/06* (2006.01)

(52) U.S. Cl.
CPC ............ *F16C 33/583* (2013.01); *F16C 33/78* (2013.01); *F16C 33/782* (2013.01); *F16C 33/7846* (2013.01); *F16C 2300/02* (2013.01)

(56) References Cited

U.S. PATENT DOCUMENTS

| | | | |
|---|---|---|---|
| 4,505,484 A * | 3/1985 | Ohkuma | F16C 33/7853 |
| | | | 277/348 |
| 4,557,612 A * | 12/1985 | Neal | F16C 33/782 |
| | | | 277/423 |
| 4,655,617 A | 4/1987 | Yasui et al. | |
| 4,874,073 A | 10/1989 | Tagawa | |
| 5,558,448 A | 9/1996 | Yabe et al. | |
| RE36,804 E | 8/2000 | Kajihara et al. | |
| 6,402,158 B1 * | 6/2002 | Imazaike | F16O 33/7846 |
| | | | 277/549 |
| 6,709,161 B2 | 3/2004 | Yakura et al. | |
| 7,029,181 B2 | 4/2006 | Terada et al. | |
| 7,547,146 B2 * | 6/2009 | Kinno | C23C 28/00 |
| | | | 384/477 |
| 8,523,449 B2 | 9/2013 | Hamada et al. | |
| 8,876,395 B2 | 11/2014 | Sakaguchi | |
| 9,500,232 B2 | 11/2016 | Ishii | |
| 2006/0088235 A1 | 4/2006 | Ueda | |
| 2007/0154124 A1 | 7/2007 | Inoue et al. | |
| 2011/0002568 A1 | 1/2011 | Kawamura et al. | |
| 2011/0142388 A1 | 6/2011 | Maejima et al. | |
| 2012/0301065 A1 | 11/2012 | Mori et al. | |
| 2017/0204908 A1 | 7/2017 | Ishii et al. | |

FOREIGN PATENT DOCUMENTS

| | | | | |
|---|---|---|---|---|
| JP | 2004-068924 A | 3/2004 | | |
| JP | 2004-100917 A | 4/2004 | | |
| JP | 2004-211862 A | 7/2004 | | |
| JP | 2004211862 A * | 7/2004 | ......... | F16C 33/7846 |
| JP | 2004-239293 A | 8/2004 | | |
| JP | 2004-293563 A | 10/2004 | | |
| JP | 2005-076660 A | 3/2005 | | |
| JP | 2005-233248 A | 9/2005 | | |
| JP | 2007-112920 A | 5/2007 | | |
| JP | 2010-048326 A | 3/2010 | | |
| JP | 2010-048328 A | 3/2010 | | |
| JP | 2010-164122 A | 7/2010 | | |
| JP | 2011-208662 A | 10/2011 | | |
| JP | 2012-184814 A | 9/2012 | | |
| JP | 5636819 B2 | 12/2014 | | |
| JP | 2015-086940 A | 5/2015 | | |
| JP | 2016-023647 A | 2/2016 | | |
| JP | 2016-223598 A | 12/2016 | | |
| JP | 2017-009016 A | 1/2017 | | |
| WO | 2004007983 A1 | 1/2004 | | |
| WO | 2016010057 A1 | 1/2016 | | |
| WO | 2016083133 A1 | 6/2016 | | |

OTHER PUBLICATIONS

Aug. 30, 2016 Written Opinion issued in International Patent Application No. PCT/JP2016/066287.
Jan. 10, 2018 Office Action issued in U.S. Appl. No. 15/408,721.
Sep. 17, 2018 Office Action issued in U.S. Appl. No. 16/053,179.
Jul. 31, 2018 Notice of Allowance issued in U.S. Appl. No. 15/408,721.
U.S. Appl. No. 16/144,618, filed Sep. 27, 2018 in the name of Yamamoto et al.
U.S. Appl. No. 15/408,721, filed Jan. 18, 2017 in the name of Ishii et al.
U.S. Appl. No. 16/053,179, filed Aug. 2, 2018 in the name of Ishii et al.
U.S. Appl. No. 15/919,936, filed Mar. 13, 2018 in the name of Ishii et al.
U.S. Appl. No. 15/928,189, filed Mar. 22, 2018 in the name of Ishii et al.
Sep. 20, 2018 Office Action issued in U.S. Appl. No. 15/919,936.

* cited by examiner (ONE SIDE IN AXIAL DIRECTION)   (THE OTHER SIDE IN AXIAL DIRECTION)

ROLLING BEARING

TECHNICAL FIELD

The present invention relates to a rolling bearing.

BACKGROUND ART

A rolling bearing is known as a bearing that supports a rotation shaft of various types of mechanical devices, and the rolling bearing requires reliability so that burning does not occur. Thus, a rolling bearing, in which grease lubrication having high lubrication performance is adopted, has increased even in the case of high-speed rotation application. In the grease lubrication, the inside of the bearing is filled with grease in advance (for example, refer to PTL 1).

FIG. 4 is a sectional view illustrating an example of a rolling bearing of the related art. The rolling bearing is an angular contact ball bearing 90, and a ball 94 is in contact with an inner ring 91 and an outer ring 92 at a predetermined angle (contact angle). In such an angular contact ball bearing 90, a shoulder diameter D2 of the inner ring 91 on the other side in an axial direction (right side in FIG. 4) is longer than a shoulder diameter D1 of the inner ring on one side in the axial direction (left side in FIG. 4) (D1<D2).

As described above, inside the bearing, in other words, in the bearing of which an annular space 93 formed between the inner ring 91 and the outer ring 92 is filled with grease, seals 97 and 98 are provided on both sides of the annular space 93 in the axial direction. In the angular contact ball bearing 90 illustrated in FIG. 4, the seals 97 and 98 are used as labyrinth seals (non-contact seals) in order to realize high-speed rotation. In other words, the seals 97 and 98 form labyrinth clearances 97a and 98a with the inner ring 91, preventing the spill of grease.

CITATION LIST

Patent Literature

[PTL 1] JP-A-2007-112920

SUMMARY OF INVENTION

Technical Problem

In the case of the angular contact ball bearing 90, an effect of grease in the annular space 93 flowing from one side in the axial direction (left side in FIG. 4) to the other side in the axial direction (right side in FIG. 4) occurs due to the centrifugal force when the inner ring 91 rotates. In particular, in a case where the bearing rotates at a high speed, the effect strengthens.

Then, in some cases, the grease in the annular space 93 concentrates into a space 95 on the other side in the axial direction, deviation of grease occurs, and soon the grease infiltrates into the labyrinth clearance 98a, leaking to the outside of the bearing. When the leakage of grease occurs, there is a possibility that a lubrication failure occurs in the angular contact ball bearing 90 and defects, such as burning, a temperature rise, and wear, occur.

As described above, an effect of grease flowing from one side in the axial direction to the other side can occur in a rolling bearing other than the rolling bearing of which the inner ring 91 have different shoulder diameters. For example, grease moves from one side in the axial direction to the other side in some cases due to the spin of rolling elements (balls) accompanying the rotation of a bearing even when the shoulder diameters of an inner ring on one side in the axial direction and on the other side are the same.

Thus, an object of the invention is to increase airtightness by means of a seal on the other side in an axial direction in a rolling bearing, in which an effect of grease in an annular space formed between an inner ring and an outer ring flowing from one side in the axial direction to the other side occurs.

Solution to Problem

According to the invention, there is provided a rolling bearing including:
an inner ring,
an outer ring,
a plurality of rolling elements provided between the inner ring and the outer ring,
a cage that holds the rolling elements,
a first seal that is provided on one side of an annular space between the inner ring and the outer ring in an axial direction of the rolling bearing and has a first lip portion which forms a first labyrinth clearance with the inner ring to prevent spill of grease, and
a second seal that is provided on the other side of the annular space in the axial direction and has a second lip portion which forms a second labyrinth clearance with the inner ring to prevent spill of the grease,
wherein the rolling bearing is configured such that the grease in the annular space flows from one side in the axial direction to the other side in the axial direction, and
the second lip portion is larger than the first lip portion such that a path length of the second labyrinth clearance is longer than a path length of the first labyrinth clearance.

A dimension of the second lip portion in the axial direction may be greater than a dimension of the first lip portion in the axial direction.

A radius of the inner ring at an entrance portion of the second labyrinth clearance disposed on an inside of the rolling bearing may be longer than a radius of the inner ring at an exit portion of the second labyrinth clearance disposed on an outside of the rolling bearing.

The inner ring may have an annular side surface provided from an outer circumferential surface of a shoulder portion on the other side in the axial direction to an inward side in a radial direction of the rolling bearing. The second lip portion may have a lip side surface opposing the annular side surface with a clearance. The entrance portion of the second labyrinth clearance may be formed between the annular side surface and the lip side surface and the entrance portion may be open in the radial direction.

The second lip portion may have a lip inclined surface that extends from an end portion of the lip side surface on an outward side in the radial direction, which is a starting point, to the outward side as spreading out to the other side in the axial direction. An intersection point of the outer circumferential surface of the shoulder portion and the annular side surface and the starting point may have the same radial position.

A radius of the inner ring at the entrance portion may be longer than A radius of the inner ring at the exit portion.

A dimension of a second space, which is formed between an outward end portion of the second seal in the radial direction and the second lip portion, in the radial direction may be greater than a dimension of a first space, which is formed between an outward end portion of the first seal in the radial direction and the first lip portion, in the radial direction.

The cage may have an annular portion on the other side of the rolling elements in the axial direction. An inner circumferential surface of the annular portion may have a tapered surface, which is inclined to the outward side in the radial direction as spreading out to the other side in the axial direction.

The inner ring may have the annular side surface extending from the outer circumferential surface of the shoulder portion on the other side in the axial direction to the inward side in the radial direction. The second lip portion may have the lip side surface opposing the annular side surface with a clearance and a lip inclined surface that extends from an end portion of the lip side surface on the outward side in the radial direction, which is a starting point, to the outward side in the radial direction as spreading out to the other side.

A surface of the annular portion on the other side in the axial direction may be positioned closer to one side in the axial direction than the entrance portion of the second labyrinth clearance.

Advantageous Effects of Invention

According to the invention, even when an effect of grease formed between the inner ring and the outer ring flowing from one side in the axial direction to the other side occurs in an annular space, the leakage of the grease to the outside of the bearing can be effectively suppressed since the path length of the second labyrinth clearance on the other side in the axial direction is longer. In other words, it is possible to increase airtightness by means of the seal on the other side in the axial direction.

The path length of the second labyrinth clearance can be made longer than the path length of the first labyrinth clearance since the axial dimension of the second lip portion is greater than the axial dimension of the first lip portion.

According to the invention, grease flowing along the outer circumferential surface of the shoulder portion on the other side in the axial direction is unlikely to enter the second labyrinth clearance. In addition, the space between the annular side surface and the lip side surface is included in the second labyrinth clearance, and thus the path length of the second labyrinth clearance can be made longer.

According to the invention, the grease flowed along the outer circumferential surface of the shoulder portion on the other side in the axial direction is likely to flow along the lip inclined surface, and the grease is used in lubricating the angular contact ball bearing.

A greater centrifugal force is applied to an object with a longer rotation radius. Thus, according to the invention, in a state where there is grease in the second labyrinth clearance on the other side in the axial direction, a greater centrifugal force acts on grease on an entrance portion side than on grease on an exit portion side. For this reason, an effect of returning grease in the second labyrinth clearance to the bearing inside occurs.

According to the invention, the annular space, in particular, a space on the other side in the axial direction can be made wider, and the storage amount of grease can be increased. Consequently, it is possible to extend the life of the bearing.

According to the invention, it is possible to expand the space between the annular portion of the cage and the shoulder portion of the inner ring to the other side in the axial direction, and the tapered surface can direct grease approaching the other side in the axial direction to the outward side in the radial direction. For this reason, it is possible to make grease unlikely to enter the second labyrinth clearance on the other side in the axial direction.

According to the invention, grease flowed to the outer circumferential surface of the shoulder portion on the other side in the axial direction is likely to flow along the lip inclined surface, and the grease is used in lubricating the angular contact ball bearing. If the second lip portion has the lip inclined surface described above, the clearance between the second lip portion and the annular portion of the cage becomes narrower and grease is likely to stay in the vicinity of the entrance portion of the second labyrinth clearance. However, a tendency of grease to stay in the vicinity of the entrance portion of the second labyrinth clearance can be suppressed by the inner circumferential surface of the annular portion having the tapered surface as described above, and it is possible to make grease unlikely to enter the second labyrinth clearance.

According to the invention, in a case where grease at the entrance portion of the second labyrinth clearance flows to the outward side in the radial direction with the rotation of the bearing due to the centrifugal force, grease at the entrance portion is likely to flow to the outward side in the radial direction since there is no annular portion on the outward side of the entrance portion in the radial direction. As a result, the grease at the entrance portion of the second labyrinth clearance passes through the second labyrinth clearance and is unlikely to spill to the outside of the bearing.

According to the rolling bearing of the invention, it is possible to increase airtightness by means of the seal on the other side in the axial direction, and the long-term reliability of the bearing can be improved.

DESCRIPTION OF EMBODIMENTS

Hereinafter, an embodiment of a rolling bearing of the invention will be described.

(Entire Configuration of Angular Contact Ball Bearing)

Figure 1:
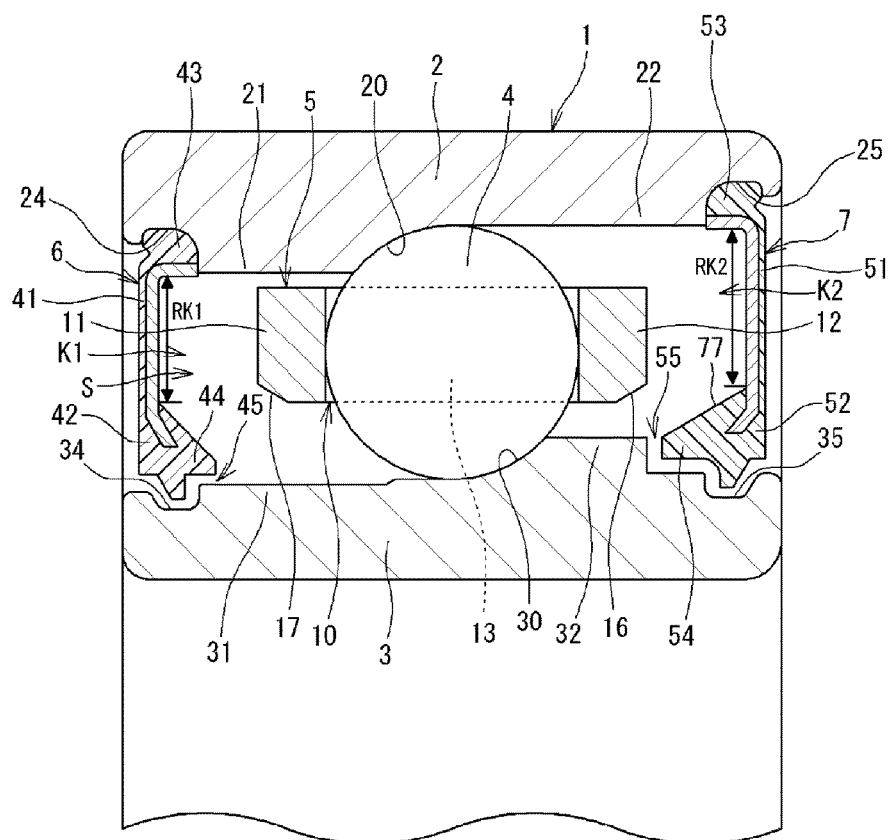
FIG. 1 is a sectional view illustrating one form of carrying out a rolling bearing of the invention.

FIG. 1 is a sectional view illustrating one form of carrying out the rolling bearing of the invention. The rolling bearing is an angular contact ball bearing 1, and includes an outer ring 2, an inner ring 3, a plurality of balls (rolling elements) 4, an annular cage 5, a first seal 6, and a second seal 7. An annular space S that is formed between the outer ring 2 and the inner ring 3 is filled with grease. In other words, grease lubrication is adopted in the angular contact ball bearing 1, ensuring lubrication performance. In addition, in the embodiment, the angular contact ball bearing 1 is used under the condition of high-speed rotation.

The terms "one side in an axial direction" and "the other side in the axial direction" will be used in the following description related to the position of the angular contact ball bearing 1 in the axial direction. The one side in the axial direction is the left side in FIG. 1, and the other side in the axial direction is the right side in FIG. 1.

An outer ring raceway groove 20 where the balls 4 roll is formed in an inner circumferential surface of the outer ring 2. The balls 4 come into contact with the outer ring raceway groove 20 at a predetermined contact angle. The outer ring 2 has a first outer shoulder portion 21 and a second outer shoulder portion 22 on both sides in the axial direction with the outer ring raceway groove 20 being sandwiched therebetween. In the embodiment, the inner diameter (shoulder diameter) of the second outer shoulder portion 22 is larger than the inner diameter (shoulder diameter) of the first outer shoulder portion 21. In addition, a first groove 24 for fixing the seal 6 is formed in an end portion of the first outer shoulder portion 21 on one side in the axial direction, and a second groove 25 for fixing the seal 7 is formed in an end portion of the second outer shoulder portion 22 on the other side in the axial direction.

An inner ring raceway groove 30 where the balls 4 roll is formed in an outer circumferential surface of the inner ring 3. The balls 4 come into contact with the inner ring raceway groove 30 at a predetermined contact angle. The inner ring 3 has a first inner shoulder portion 31 and a second inner shoulder portion 32 on both sides in the axial direction with the inner ring raceway groove 30 being sandwiched therebetween. In the embodiment, the outer diameter (shoulder diameter) of the second inner shoulder portion 32 is longer than the outer diameter (shoulder diameter) of the first inner shoulder portion 31. In addition, a first seal groove 34 is formed in an end portion of the first inner shoulder portion 31 on one side in the axial direction, and a second seal groove 35 is formed in an end portion of the second inner shoulder portion 32 on the other side in the axial direction. As described above, the outer circumferential surface of the inner ring 3 has a shape in which an outer diameter thereof becomes gradually longer as a whole (except for regions where the seal grooves 34 and 35 are formed) from one side in the axial direction to the other side. A shape, in which the shoulder diameters on one side in the axial direction and on the other side are different, as in the embodiment will be called as angular shape as in the following.

The plurality of balls 4 are provided in the annular space S between the outer ring 2 and the inner ring 3. When the angular contact ball bearing 1 rotates (when the inner ring 3 rotates in the embodiment), the balls 4 roll in the outer ring raceway groove 20 and the inner ring raceway groove 30 in a state of being held by the cage 5.

The cage 5 can hold the plurality of balls 4 in a circumferential direction at predetermined intervals (equal intervals), and for this reason, a plurality of pockets 10 for accommodating the balls 4 are formed in the circumferential direction in the cage 5. The cage 5 of the embodiment has a first circular portion 11 provided on one side of the balls 4 in the axial direction, a plurality of pillar portions 13 extending from the first circular portion 11 to the other side in the axial direction, and a second circular portion 12 provided on the other side of the balls 4 in the axial direction. Each of the pillar portions 13 connects the first circular portion 11 and the second circular portion 12 together. A space between a pair of the pillar portion 13 and the pillar portion 13 adjacent to each other in the circumferential direction, that is, between the first circular portion 11 and the second circular portion 12 is the pocket 10. Although the cage 5 of the embodiment is made of a resin, the cage may be made of a metal. In addition, the cage 5 of the embodiment is a cage that guides the outer ring so as to be positioned in an radial direction by the first circular portion 11 coming into sliding-contact with the inner circumferential surface of a part (first outer shoulder portion 21) of the outer ring 2.

The first seal 6 includes an annular core bar 41 and a seal main body 42 fixed to the core bar 41. The core bar 41 is made of a metal, the seal main body 42 is made of rubber, and the seal main body 42 is fixed to the core bar 41. The seal main body 42 has a radially outward end portion 43 attached to the first groove 24 and a lip portion (first lip portion) 44 opposing the seal groove 34 with a clearance therebetween. The first seal 6 comes into a state of being attached to the outer ring 2 by the radially outward end portion 43 being fitted and fixed into the first groove 24. A small clearance is formed between the first lip portion 44 and the seal groove 34, and the clearance is a first labyrinth clearance 45. In other words, a labyrinth seal (non-contact seal) is configured of the first lip portion 44 and the seal groove 34.

The second seal 7 includes an annular core bar 51 and a seal main body 52 fixed to the core bar 51. The core bar 51 is made of a metal, the seal main body 52 is made of rubber, and the seal main body 52 is fixed to the core bar 51. The seal main body 52 has a radially outward end portion 53 attached to the second groove 25 and a lip portion (second lip portion) 54 opposing the seal groove 35 with a clearance therebetween. The second seal 7 comes into a state of being attached to the outer ring 2 by the radially outward end portion 53 being fitted and fixed into the second groove 25. A small clearance is formed between the second lip portion 54 and the seal groove 35, and the clearance is a second labyrinth clearance 55. In other words, a labyrinth seal (non-contact seal) is configured of the second lip portion 54 and the seal groove 35. By having such a non-contact seal, a configuration suitable for high-speed rotation is achieved.

The angular contact ball bearing 1 illustrated in FIG. 1 includes the first seal 6 having the first lip portion 44 and the second seal 7 having the second lip portion 54. The first seal 6 is provided on one side of the annular space S in the axial direction, and forms the first labyrinth clearance 45 with the inner ring 3 to prevent the spill of grease. The second seal 7 is provided on the other side of the annular space S in the axial direction, and forms the second labyrinth clearance 55 with the inner ring 3 to prevent the spill of grease. The seals 6 and 7 prevent the leakage of grease in the annular space S to the outside.

In the case of the angular contact ball bearing 1 illustrated in FIG. 1, an effect (pumping effect) of the grease in the annular space S flowing from one side in the axial direction (left side in FIG. 1) to the other side (right side in FIG. 1) occurs due to the angular shape when the inner ring 3 rotates. In particular, an effect of the grease moving along the outer circumferential surface of the inner ring 3 from an inner ring smaller end side (first inner shoulder portion 31 side), which is one side in the axial direction, to an inner ring larger end side (second inner shoulder portion 32), which is the other side in the axial direction, occurs. In addition, such movement of grease occurs also due to the spin of the balls 4. In particular, the effect strengthens in a case where the bearing rotates at a high speed.

Then, the grease in the annular space S concentrates into a space K2 on the other side in the axial direction, and deviation of grease occurs. Thus, the second seal 7 prevents such grease from leaking to the outside of the bearing. The space K2 functions as a space for putting in grease.

(First Seal 6 and Second Seal 7)

Figure 2:
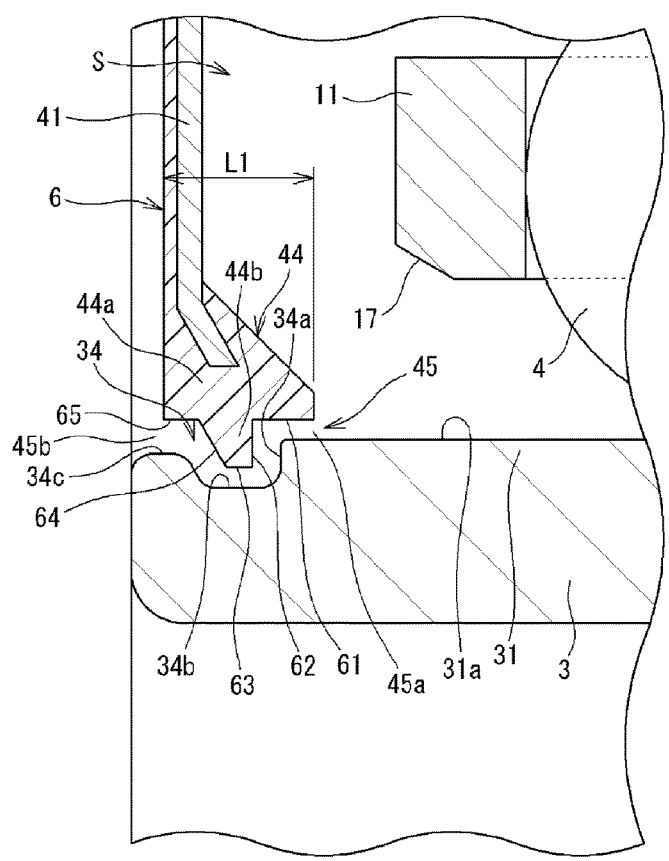
FIG. 2 is an enlarged view of a first seal and a first seal groove.

FIG. 2 is an enlarged view of the first seal 6 and the first seal groove 34. The first lip portion 44 of the first seal 6 has a main body portion 44a of which a part is fixed to the core bar 41 and a protruding portion 44b protruding from an inner peripheral side of the main body portion 44a to an inward side in the radial direction. Only the protruding portion 44b is in a state of being accommodated in the first seal groove 34.

As surfaces opposing the inner ring 3, the first lip portion 44 has a lip inside cylindrical surface 61, a lip annular surface 62, a lip intermediate side cylindrical surface 63, a lip intermediate side inclined surface 64, and a lip outside cylindrical surface 65 in this order from a bearing inside (ball 4 side). Meanwhile, the first seal groove 34 has an annular side surface 34a, a cylindrical surface 34b, and a raised projection surface 34c in this order from bearing inside (ball 4 side).

The inside cylindrical surface 61 opposes a part of an outer circumferential surface 31a of the first inner shoulder portion 31. The lip annular surface 62 opposes the annular side surface 34a, the lip intermediate side cylindrical surface 63 opposes the cylindrical surface 34b, and the lip intermediate side inclined surface 64 and the lip outside cylindrical surface 65 oppose the raised projection surface 34c. The first labyrinth clearance 45 is formed between the opposing surfaces. In addition, an entrance portion 45a side of the first labyrinth clearance 45 is between the lip inside cylindrical surface 61 and a part of the outer circumferential surface 31a of the first inner shoulder portion 31. An exit portion 45b side of the first labyrinth clearance 45 is between the lip outside cylindrical surface 65 and the raised projection surface 34c.

Figure 3:
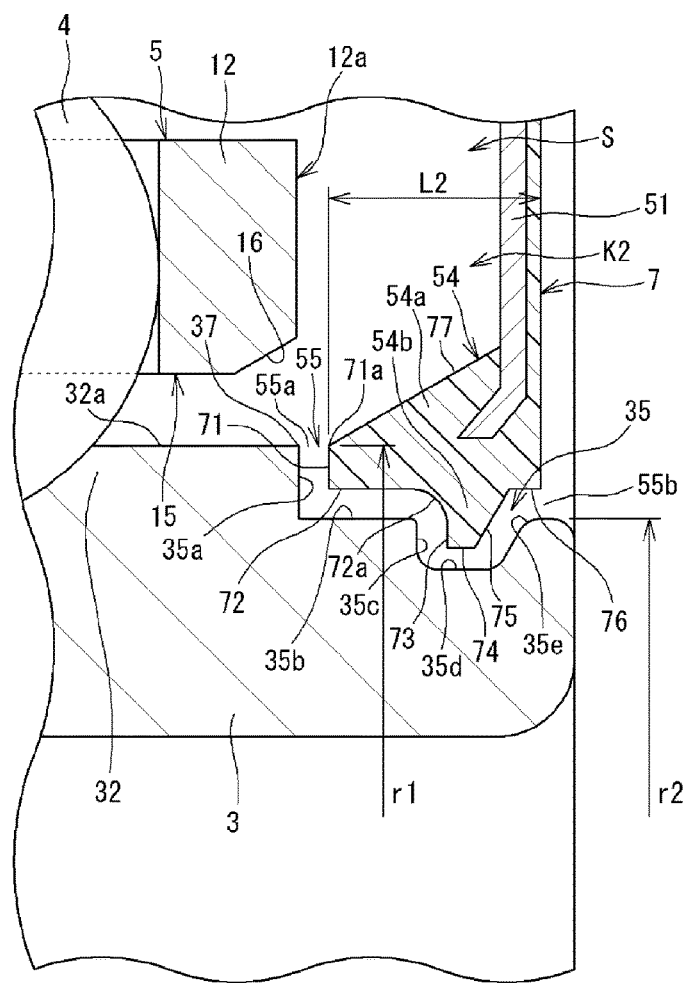
FIG. 3 is an enlarged view of a second seal and a second seal groove.

FIG. 3 is an enlarged view of the second seal 7 and the second seal groove 35. The second lip portion 54 of the second seal 7 has a main body portion 54a of which a part is fixed to the core bar 51 and a protruding portion 54b protruding from an inner peripheral side of the main body portion 54a to the inward side in the radial direction. Both of the main body portion 54a and the protruding portion 54b are in a state of being accommodated in the second seal groove 35.

As surfaces opposing the inner ring 3, the second lip portion 54 has a lip side surface 71, a lip inside cylindrical surface 72, a lip annular surface 73, a lip intermediate side cylindrical surface 74, a lip intermediate side inclined surface 75, and a lip outside cylindrical surface 76 in this order from the bearing inside (ball 4 side). Meanwhile, the second seal groove 35 has an inside annular side surface 35a, an inside cylindrical surface 35b, an intermediate side annular side surface 35c, an intermediate side cylindrical surface 35d, and a raised projection surface 35e in this order from the bearing inside (ball 4 side).

The lip side surface 71 opposes the inside annular side surface 35a, the lip inside cylindrical surface 72 opposes the inside cylindrical surface 35b, the lip annular surface 73 opposes the intermediate side annular side surface 35c, the lip intermediate side cylindrical surface 74 opposes the intermediate side cylindrical surface 35d, and the lip intermediate side inclined surface 75 and the lip outside cylindrical surface 76 oppose the raised projection surface 35e. The second labyrinth clearance 55 is formed between the opposing surfaces. In addition, an entrance portion 55a side of the second labyrinth clearance 55 is between the lip side surface 71 and the inside annular side surface 35a, and an exit portion 55b side of the second labyrinth clearance 55 is between the lip outside cylindrical surface 76 and the raised projection surface 35e.

As to a surface opposing the inner ring 3 having the first lip portion 44 and the second lip portion 54 of the embodiment, a surface including the term "cylindrical surface" is a cylindrical surface having the center line which matches the center line of the angular contact ball bearing 1, and a surface including the term "annular surface" and the lip side surface 71 are surfaces on an imaginary plane orthogonal to the center line of the angular contact ball bearing 1.

As to a surface having the first seal groove 34 and the second seal groove 35 of the embodiment, a surface including the term "annular side surface" is a surface on an imaginary plane orthogonal to the center line of the angular contact ball bearing 1, and a surface including the term "cylindrical surface" is a cylindrical surface having the center line which matches the center line of the angular contact ball bearing 1.

In FIG. 2, an axial dimension L1 of the first lip portion 44 corresponds to the sum of the axial length of each of the lip inside cylindrical surface 61, the lip intermediate side cylindrical surface 63, the lip intermediate side inclined surface 64, and the lip outside cylindrical surface 65.

In FIG. 3, an axial dimension L2 of the second lip portion 54 corresponds to the sum of the axial length of each of the lip inside cylindrical surface 72, the lip intermediate side cylindrical surface 74, the lip intermediate side inclined surface 75, and the lip outside cylindrical surface 76.

The axial lengths of the lip intermediate side cylindrical surface 74, the lip intermediate side inclined surface 75, and the lip outside cylindrical surface 76 of the second lip portion 54 (refer to FIG. 3) are the same as the axial lengths of the lip intermediate side cylindrical surface 63, the lip intermediate side inclined surface 64, and the lip outside cylindrical surface 65 of the first lip portion 44 (refer to FIG. 2), respectively. The axial length of the lip inside cylindrical surface 72 of the second lip portion 54 (refer to FIG. 3) is larger than the axial length of the lip inside cylindrical surface 61 of the first lip portion 44 (refer to FIG. 2). For this reason, the axial dimension L2 of the second lip portion 54 is greater than the axial dimension L1 of the first lip portion 44 (L1<L2). Consequently, the path length of the second labyrinth clearance 55 is longer than the path length of the first labyrinth clearance 45.

The second labyrinth clearance 55 (refer to FIG. 3) also includes a small space between the inside annular side surface 35a and the lip side surface 71, which oppose each other in the axial direction, on the entrance portion 55a side of the second labyrinth clearance 55. On the other hand, although the first labyrinth clearance 45 (refer to FIG. 2) has surfaces opposing each other in the radial direction (lip inside cylindrical surface 61 and outer circumferential surface 31a) on the entrance portion 45a side of the first labyrinth clearance 45, there is no surfaces opposing in the axial direction.

In other words, in the embodiment (refer to FIG. 3), the inner ring 3 has the inside annular side surface 35a provided from an outer circumferential surface 32a of the second inner shoulder portion 32 to the inward side in the radial direction, and the second lip portion 54 has the lip side surface 71 opposing the inside annular side surface 35a with a clearance therebetween. Since the clearance (small space) between the inside annular side surface 35a and the lip side surface 71 is also included in the second labyrinth clearance 55, the path length of the second labyrinth clearance 55 is longer than the path length of the first labyrinth clearance 45.

As described above, the second lip portion 54 is larger than the first lip portion 44 in the example. More specifically, the axial dimension L2 of the second lip portion 54 is greater than the axial dimension L1 of the first lip portion 44. Consequently, the path length of the second labyrinth clearance 55 is longer than the path length of the first labyrinth clearance 45. As described above, the path length of the second labyrinth clearance 55 formed in the inner ring 3 (second seal groove 35) is long since the second lip portion 54 of the second seal 7 is large. Therefore, the second seal 7 can effectively suppress the leakage of the grease to the outside of the bearing even when an effect of the grease in the annular space S flowing from one side in the axial direction to the other side occurs. In other words, it is possible to increase airtightness by means of the second seal 7, and long-term reliability of the bearing can be improved.

Figure 4:
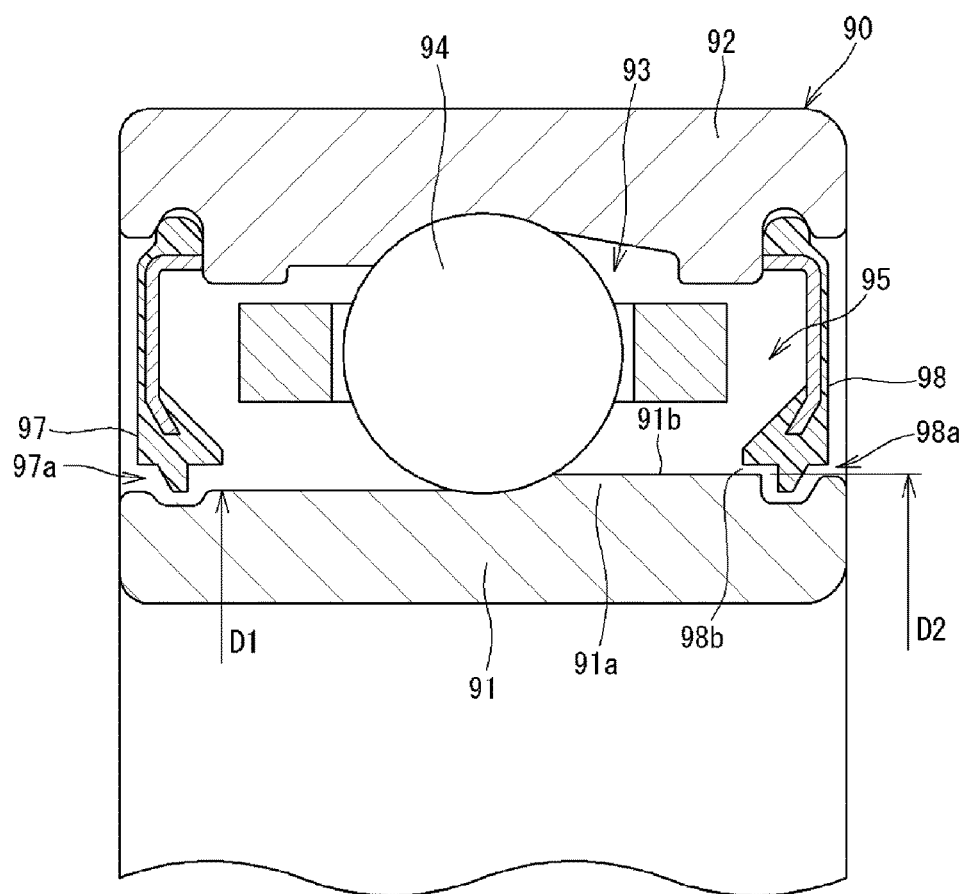
FIG. 4 is a sectional view illustrating an example of a rolling bearing of the related art.

In addition, in the embodiment (refer to FIG. 3), the entrance portion 55a of the second labyrinth clearance 55 is formed between the inside annular side surface 35a and the lip side surface 71, which oppose each other in the axial direction. The entrance portion 55a is open to an outward side in the radial direction. On the other hand, in an example of the related art illustrated in FIG. 4, an entrance portion 98b of a labyrinth clearance 98a on the other side in the axial direction is open in the axial direction. In this case, grease flowing from one side in the axial direction to the other side, in particular, grease flowing along an outer circumferential surface 91b of a shoulder portion 91a is likely to enter the labyrinth clearance 98a compared to the example.

On the other hand, in the case of the embodiment illustrated in FIG. 3, grease flowing from one side in the axial direction to the other side in the annular space S, in particular, grease flowing along the outer circumferential surface 32a of the second inner shoulder portion 32 is unlikely to enter the second labyrinth clearance 55 since the entrance portion 55a is open to the outward side in the radial direction.

In the embodiment, a surface 12a of an annular portion 12 of the cage 5 on the other side in the axial direction is positioned closer to one side in the axial direction (left side in FIG. 3) than the entrance portion 55a of the second labyrinth clearance 55. Consequently, a configuration where there is no annular portion 12 on the outward side of the entrance portion 55a in the radial direction is adopted. In other words, the entrance portion 55a is not blocked by the annular portion 12. Accordingly, in a case where grease at the entrance portion 55a flows to the outward side in the radial direction with the rotation of the bearing due to the centrifugal force, the grease is likely to flow to the outward side in the radial direction. As a result, the grease at the entrance portion 55a is unlikely to pass through the second labyrinth clearance 55 and spill to the outside of the bearing.

In addition, the second lip portion 54 has a lip inclined surface 77 that extends from an end portion 71a of the lip side surface 71 on the outward side in the radial direction, which is a starting point, to the outward side in the radial direction as spreading out to the other side in the axial direction. An intersection point 37 of the outer circumferential surface 32a of the second inner shoulder portion 32 and the inside annular side surface 35a and the starting point (end portion 71a) have the same radial position. Due to this configuration, grease, which flows along the outer circumferential surface 32a of the second inner shoulder portion 32 and passes through the entrance portion 55a, is likely to flow along the lip inclined surface 77. The grease flowed along the lip inclined surface 77 is held in the space K2 for putting in grease and is used in lubricating the angular contact ball bearing 1.

(Annular Portion 12 of Cage)

As illustrated in FIG. 3, the cage 5 has the annular portion 12 on the other side of the balls 4 in the axial direction. An inner circumferential surface 15 of the annular portion 12 has a tapered surface 16. The tapered surface 16 is inclined to the outward side in the radial direction as spreading out to the other side in the axial direction. With the tapered surface 16, it is possible to expand a space between the annular portion 12 and the second inner shoulder portion 32 to the other side in the axial direction. In addition, the tapered surface 16 can direct grease approaching the other side in the axial direction to the outward side in the radial direction.

In particular, in the embodiment, the second lip portion 54 has the lip side surface 71 opposing the inside annular side surface 35a of the second seal groove 35 with a clearance therebetween and the lip inclined surface 77 of which a starting point is the end portion 71a of the lip side surface 71 on the outward side in the radial direction, as described above. As described above, if the second lip portion 54 has the lip inclined surface 77, a clearance between the annular portion 12 of the cage 5 and the second lip portion is narrower and grease is likely to stay in the vicinity of the entrance portion 55a of the second labyrinth clearance 55. As described above, a tendency of grease to stay in the vicinity of the entrance portion 55a can be suppressed by the inner circumferential surface 15 of the annular portion 12 having the tapered surface 16. As a result, it is possible to make grease unlikely to enter the second labyrinth clearance 55.

Although a part of the inner circumferential surface 15 of the annular portion 12 is the tapered surface 16 in the embodiment illustrated in FIG. 3, the entire inner circumferential surface 15 may be the tapered surface 16.

In FIG. 1, a radial dimension RK2 of a second space K2 on a second seal 7 side is greater than a radial dimension RK1 of a first space K1 on a first seal 6 side. The first space K1 is a space formed between the radially outward end portion 43 and the first lip portion 44 of the first seal 6, and the second space K2 is a space formed between the radially outward end portion 53 and the second lip portion 54 of the second seal 7. In order to obtain this configuration, the core bar 51 of the second seal 7 has a greater radial dimension than the core bar 41 of the first seal 6.

According to this configuration, the second space K2 in the annular space S on the other side in the axial direction can be made wider and the storage amount of grease can be increased. As described above, grease flowing along the lip inclined surface 77 of the second lip portion 54 is stored in the second space K2, and after then, the grease in the space K2 flows to the ball 4 side to be used in lubricating the angular contact ball bearing 1. Accordingly, it is possible to extend the life of the bearing by making the second space K2 wider and increasing the storage amount of grease.

In FIG. 3, a radius r1 of the entrance portion 55a, which is on the bearing inside of the second labyrinth clearance 55, is longer than a radius r2 of the exit portion 55b, which is on a bearing outside of the second labyrinth clearance 55 (r1>r2). In other words, the radius of the intersection point 37 of the outer circumferential surface 32a of the second inner shoulder portion 32 and the inside annular side surface 35a is longer than the radius of the raised projection surface 35e of the second seal groove 35. That is to cause an effect of returning grease in the second labyrinth clearance 55 to the second space K2 to occur with the use of a phenomenon in which a greater centrifugal force is applied to an object with a longer rotation radius. That is, in a case where there is grease over the entire length of the second labyrinth clearance 55, the centrifugal force acts on each of grease on the entrance portion 55a side and grease on the exit portion 55b side when the bearing rotates. Thus, a greater centrifugal force acts on the grease on the entrance portion 55a side than on the grease on the exit portion 55b side by setting the shape of the seal groove 34 so as to satisfy a relationship of r1>r2 as described above. For this reason, it is possible to prevent the occurrence of an effect of returning the grease in the second labyrinth clearance 55 to the bearing inside and the leakage of grease to the outside of the bearing through the second labyrinth clearance 55.

In the cage 5 of the embodiment, the annular portion 11 on one side in the axial direction and the annular portion 12 on the other side are bilaterally symmetrical in a longitudinal section illustrated in FIG. 1. In particular, a tapered surface 17 which is bilaterally symmetrical to the tapered surface 16 formed in the annular portion 12 is formed in the annular portion 11. For this reason, a function of directing grease to the other side in the axial direction can be included even when the cage 5 is provided so as to face between any one of the inner ring 3 and the outer ring 2 in assembling the angular contact ball bearing 1.

In FIG. 3, a recessed round surface 72a is in between the lip inside cylindrical surface 72 of the second lip portion 54 and the lip annular surface 73. For this reason, in a case where there is grease between the lip annular surface 73 and the intermediate side annular side surface 35c, the centrifugal force accompanying the rotation of the bearing moves the grease to the outward side in the radial direction. At this time, however, grease is likely to flow along the recessed round surface 72a to the entrance portion 55a side. In other words, grease is likely to return to the bearing inside.

A configuration for increasing airtightness by means of a seal on the other side in the axial direction, which is related to a rolling bearing where an effect of grease in the annular space S formed between the outer ring 2 and the inner ring 3 flowing from one side in the axial direction to the other side occurs, will be described with reference to FIG. 1.

According to this configuration, there is provided a rolling bearing, which includes the inner ring 3, the outer ring 2, the plurality of rolling elements (balls 4) provided between the inner ring 3 and the outer ring 2, and the cage 5 that holds the rolling elements (balls 4) and in which an effect of grease flowing from one side in the axial direction to the other side in the annular space S formed between the inner ring 3 and the outer ring 2 occurs. The rolling bearing further includes the first seal 6 that is provided on one side of the annular space S in the axial direction and has the first lip portion 44, which forms the first labyrinth clearance 45 with the inner ring 3 to prevent the spill of grease, and the second seal 7 that is provided on the other side of the annular space S in the axial direction and has the second lip portion 54, which forms the second labyrinth clearance 55 with the inner ring 3 to prevent the spill of grease. The cage 5 has the annular portion 12 on the other side of the rolling elements (balls 4) in the axial direction. The inner circumferential surface 15 of the annular portion 12 has the tapered surface 16 which is inclined to the outward side in the radial direction as spreading out to the other side in the axial direction.

According to this configuration, it is possible to expand a space between the annular portion 12 of the cage 5 and the shoulder portion (second inner shoulder portion 32) of the inner ring 3 to the other side in the axial direction and the tapered surface 16 can direct grease approaching the other side in the axial direction to the outward side in the radial direction. As a result, even when an effect of grease in the annular space S flowing from one side in the axial direction to the other side occurs, it is possible to make grease unlikely to enter the second labyrinth clearance 55 on the other side in the axial direction and the leakage of the grease to the outside of the bearing can be suppressed.

In this configuration, the inner ring 3 can be configured so as to have the inside annular side surface 35a provided from the outer circumferential surface 32a of the shoulder portion (second inner shoulder portion 32) on the other side in the axial direction to the inward side in the radial direction, and the second lip portion 54 can be configured so as to have the lip side surface 71 opposing the inside annular side surface 35a with a clearance therebetween and the lip inclined surface 77 that extends from the end portion 71a of the lip side surface 71 on the outward side in the radial direction, which is a starting point, to the outward side in the radial direction as spreading out to the other side in the axial direction.

In this configuration, the surface 12a of the annular portion 12 on the other side in the axial direction can be configured so as to be positioned closer to one side in the axial direction than the entrance portion 55a of the second labyrinth clearance 55.

The example described in FIG. 1 to FIG. 3 can be applied to this configuration.

The embodiment disclosed hereinbefore is merely examples in all aspects and does not limit the invention. In other words, the rolling bearing of the invention may be in other forms within the scope of the invention without being limited to the illustrated form. For example, rolling elements are the balls 4 but the rolling elements may be rollers.

In a form illustrated in FIG. 1, although a case where the inner diameter (shoulder diameter) of the second outer shoulder portion 22 is longer than the inner diameter (shoulder diameter) of the first outer shoulder portion 21, in the outer ring 2, has been described, the inner diameters (shoulder diameters) may be the same. In this case, the rotation of the cage 5 between the annular portions 11 and 12 on both sides of the cage is guided by the outer ring 2. In addition, in a case where the shoulder diameters of the outer ring 2 are the same, it is preferable to form a recessed portion for putting in grease in the second outer shoulder portion 22 in order to raise the storage amount of grease on the other side in the axial direction.

The rolling bearing of the invention may be for high-speed rotation application or may be for general application.

INDUSTRIAL APPLICABILITY

According to the rolling bearing of the invention, it is possible to increase airtightness by means of the seal on the other side in the axial direction and the long-term reliability of the bearing can be improved.

REFERENCE SIGNS LIST

1: angular contact ball bearing (rolling bearing)
2: outer ring
3: inner ring
4: ball (rolling element)
5: cage
6: first seal
7: second seal
12: second circular portion (annular portion)
12a: surface on the other side in axial direction
15: inner circumferential surface
16: tapered surface
32: second inner shoulder portion (of shoulder portion on the other side in axial direction)
32a: outer circumferential surface 35a: inside annular side surface (annular side surface)
37: intersection point
43: radially outward end portion
44: first lip portion
45: first labyrinth clearance
53: radially outward end portion
54: second lip portion
55: second labyrinth clearance
55a: entrance portion
71: lip side surface
71a: end portion
77: lip inclined surface
K1: first space
K2: second space
RK1: radial dimension of first space
RK2: radial dimension of second space
L1: axial dimension of first lip portion
L2: axial dimension of second lip portion
r1: radius of entrance portion
r2: radius of exit portion
S: annular space

The invention claimed is:

1. A rolling bearing comprising:
an inner ring;
an outer ring;
a plurality of rolling elements provided between the inner ring and the outer ring;
a cage that holds the rolling elements;
a first seal that is provided on one side of an annular space between the inner ring and the outer ring in an axial direction of the rolling bearing and has a first lip portion which forms a first labyrinth clearance with the inner ring to prevent spill of grease; and
a second seal that is provided on the other side of the annular space in the axial direction and has a second lip portion which forms a second labyrinth clearance with the inner ring to prevent spill of the grease,
wherein the rolling bearing is configured such that the grease in the annular space flows from one side in the axial direction to the other side in the axial direction, and
the second lip portion is larger than the first lip portion such that a path length of the second labyrinth clearance is longer than a path length of the first labyrinth clearance.

2. The rolling bearing according to claim 1,
wherein a dimension of the second lip portion in the axial direction is greater than a dimension of the first lip portion in the axial direction.

3. The rolling bearing according to claim 1,
wherein a radius of the inner ring at an entrance portion of the second labyrinth clearance disposed on an inside of the rolling bearing is longer than a radius of the inner ring at an exit portion of the second labyrinth clearance disposed on an outside of the rolling bearing.

4. The rolling bearing according to claim 1,
wherein the inner ring has an annular side surface provided from an outer circumferential surface of a shoulder portion on the other side in the axial direction to an inward side in a radial direction of the rolling bearing,
the second lip portion has a lip side surface opposing the annular side surface with a clearance,
the entrance portion of the second labyrinth clearance is formed between the annular side surface and the lip side surface, and
the entrance portion is open in the radial direction.

5. The rolling bearing according to claim 4,
wherein the second lip portion has a lip inclined surface that extends from an end portion of the lip side surface on an outward side in the radial direction, which is a starting point, to the outward side as spreading out to the other side in the axial direction, and
an intersection point of the outer circumferential surface of the shoulder portion and the annular side surface and the starting point have the same radial position.

6. The rolling bearing according to claim 4
wherein a radius of the inner ring at the entrance portion is longer than a radius of the inner ring at the exit portion of the second labyrinth clearance.

7. The rolling bearing according to claim 1,
wherein a dimension of a second space, which is formed between an outward end portion of the second seal in the radial direction and the second lip portion, in the radial direction is greater than a dimension of a first space, which is formed between an outward end portion of the first seal in the radial direction and the first lip portion, in the radial direction.

8. The rolling bearing according to claim 1,
wherein the cage has an annular portion on the other side of the rolling elements in the axial direction, and
an inner circumferential surface of the annular portion has a tapered surface, which is inclined to the outward side in the radial direction as spreading out to the other side in the axial direction.

9. The rolling bearing according to claim 8,
wherein the inner ring has the annular side surface extending from the outer circumferential surface of the shoulder portion on the other side in the axial direction to the inward side in the radial direction, and
the second lip portion has the lip side surface opposing the annular side surface with a clearance and a lip inclined surface that extends from an end portion of the lip side surface on the outward side in the radial direction, which is a starting point, to the outward side in the radial direction as spreading out to the other side.

10. The rolling bearing according to claim 8,
wherein a surface of the annular portion on the other side in the axial direction is positioned closer to one side in the axial direction than the entrance portion of the second labyrinth clearance.

* * * * *